(12) United States Patent
Bollmohr et al.

(10) Patent No.: US 9,234,326 B2
(45) Date of Patent: Jan. 12, 2016

(54) BASE FRAME FOR AN OFFSHORE PLATFORM AND METHOD FOR INSTALLING SUCH A BASE FRAME

(71) Applicant: Nordic Yards Holding GmbH, Wismar (DE)

(72) Inventors: Thomas Bollmohr, Rostock (DE); Constantin Hagemeister, Wismar (DE); Matthias Linnemann, Wismar (DE); Helge Mokros, Wismar (DE); Frank Mönnig, Neubukow (DE)

(73) Assignee: NORDIC YARDS HOLDING GMBH, Wismar (DE)

( * ) Notice: Subject to any disclaimer, the term of this patent is extended or adjusted under 35 U.S.C. 154(b) by 0 days.

(21) Appl. No.: 13/740,926

(22) Filed: Jan. 14, 2013

(65) Prior Publication Data

US 2013/0202360 A1 Aug. 8, 2013

(30) Foreign Application Priority Data

Feb. 3, 2012 (EP) .................................... 12000733

(51) Int. Cl.
E02B 17/02 (2006.01)
E02B 17/00 (2006.01)

(52) U.S. Cl.
CPC ......... *E02B 17/02* (2013.01); *E02B 2017/0043* (2013.01)

(58) Field of Classification Search
USPC .............. 405/195.1, 196–200, 203, 205, 207, 405/224, 227
See application file for complete search history.

(56) References Cited

U.S. PATENT DOCUMENTS

| 2,953,904 | A | * | 9/1960 | Christenson | ................... | 405/196 |
| 3,751,930 | A | * | 8/1973 | Mott et al. | ..................... | 405/196 |
| 4,083,193 | A |   | 4/1978 | Evans |  |  |
| 4,552,486 | A | * | 11/1985 | Knox et al. | .................... | 405/227 |
| 4,723,875 | A |   | 2/1988 | Sutton |  |  |

FOREIGN PATENT DOCUMENTS

EP 0039590 A2 11/1981
WO 96/20313 A1 7/1996

* cited by examiner

*Primary Examiner* — Sean Andrish
(74) *Attorney, Agent, or Firm* — Vidas, Arrett & Steinkraus, P.A.

(57) ABSTRACT

A base frame for an offshore platform and a method for installing such a base frame includes a self-floating lower building structure having a stable trim, at least one tank in the lower building structure which is dimensioned such that the lower building structure sinks when the tank is flooded, mechanism for flooding at least one tank, and a mechanism for bearing piles in upright standing arrangement on the lower building structure. The method builds a base frame, transports the base frame to the sea in a self-floating manner and floods the base frame until it is on the sea floor and then anchors the base frame to the sea floor with piles.

14 Claims, 18 Drawing Sheets

*Fig.16*
*Fig.17*
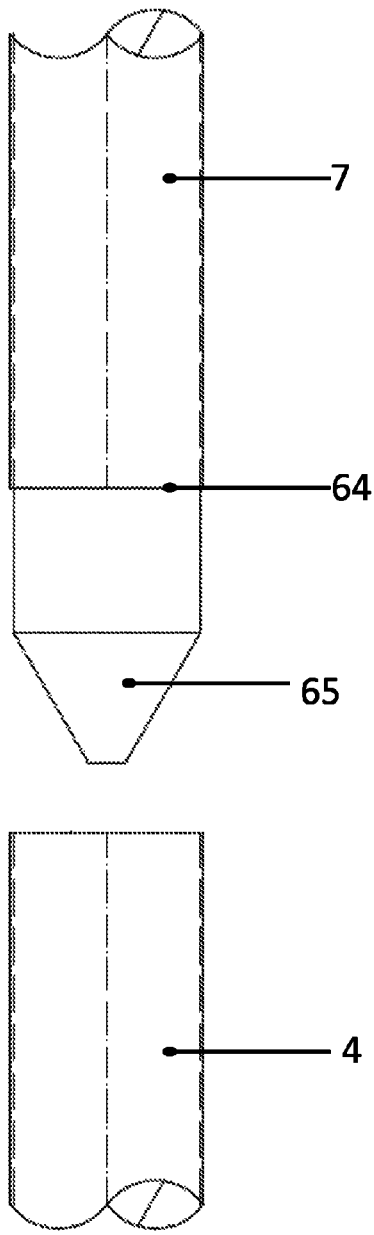
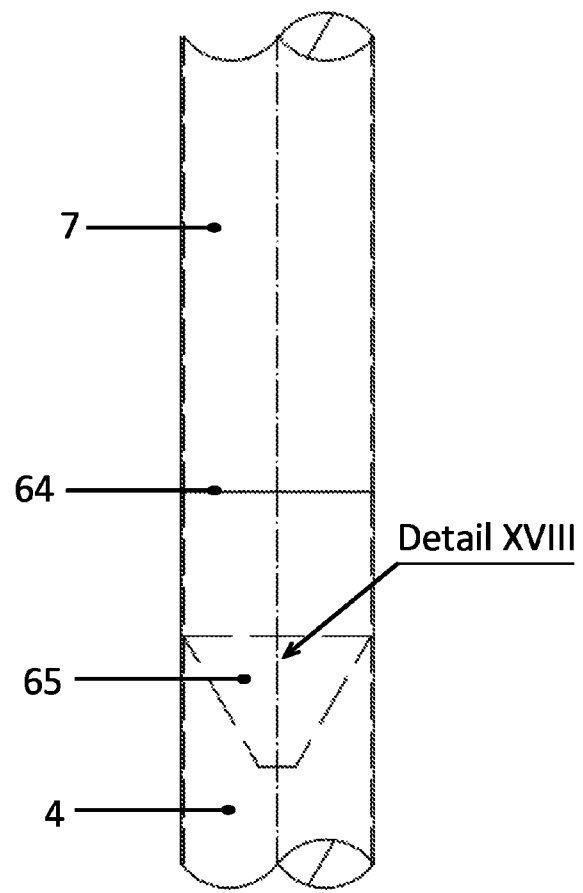

BASE FRAME FOR AN OFFSHORE PLATFORM AND METHOD FOR INSTALLING SUCH A BASE FRAME

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to a base frame for an offshore platform and to a method for installing a base frame for an offshore platform.

Offshore platforms are artificial floors in the sea, which mostly serve for housing technical equipment and quarters for the crew. The present invention relates in particular to offshore platforms for collecting electrical energy by offshore wind energy turbines and the transportation thereof to a land station in the rectified or the not rectified condition. Such offshore platforms are also called transformer platforms. The present invention can also be applied to other offshore-related topics.

Offshore platforms with a base frame consisting of a steel tube frame are already known. The steel tube frame is hauled to the set-up location on a barge with the aid of a tugboat. There, it is let down to the sea floor by means of floating cranes. Further, piles are set into corresponding bearings of the base frame and driven into the sea floor by means of floating cranes. The piles are grouted with the base frame.

Further, a topside of a platform is transported to the set-up location on a barge, and legs are set into corresponding bearings of the topside of the platform by means of floating cranes. In close vicinity to the sea floor, the legs are set into the upper openings of the piles with their lower ends, and grouted with them. The works under water must be done by means of diving robots or be performed and controlled by divers.

It is also already known to use self-floating platform topsides which are hauled to the set-up location with the legs being already set in. There, the legs will be connected to the piles in the above-described manner.

The installation of the known offshore platforms is expensive.

BRIEF SUMMARY OF THE INVENTION

Starting from this, the present invention is based on the task to provide a base frame for an offshore platform and a method suited for installing a base frame for an offshore platform, which decreases the expenditure for erection of the offshore platform.

The base frame for an offshore platform includes a self-floating lower building structure having a stable trim. It also includes at least one tank in the lower building structure which is dimensioned such that the lower building structure sinks when the tank is flooded A mechanism for flooding at least one tank is used to flood the tank or tanks, and a mechanism for bearing piles in upright standing arrangement on the lower building structure is employed to anchor the base frame to the sea floor.

The base frame of the present invention comprises a self-floating lower building structure having a stable trim, which is preferably made of boards and profiles in a manner similar to shipbuilding. The lower building structure can be transported from the shore to the set-up location on the sea in self-floating manner. Tugboats can be used for this. It is not necessary to provide the lower building structure with a drive of its own. It is not necessary to use barges for the transportation of the base frame to the set-up location. The base frame can be let down to the sea floor at the set-up location by flooding the at least one tank. It is not necessary to use deck cranes for unloading the base frame from a barge and for letting down the base frame in the water. The building structure has a stable trim, i.e. as far as the inclination does not exceed a maximum value, it raises upright automatically from a laterally inclined position. As a consequence, the base frame can be brought into a defined initial position, from which it can be let down to the desired site on the sea floor by flooding the tanks. The piles are aligned in upright arrangement or in the upright position on the lower building structure by the means for bearing, so that the base frame is used as a kind of master plate for driving the piles into the sea floor. In principle, floating cranes are not necessary for this. The upright arrangement of the piles on the lower building structure refers to the stable trim of the lower building structure. Thus, the difficult utilization of heavy technical equipment like floating cranes under offshore conditions can be avoided.

The means for bearing the piles in upright arrangement are configured such that they bear the piles in an alignment that is as vertical as possible. Preferably, the means for bearing the piles bear the piles in vertical alignment, as the case may be with tolerances (5° at most, preferably 2° at most).

According to an advantageous embodiment, piles are stored in the means for bearing and the base frame equipped with the piles is self-floating and has a stable trim. In this embodiment, the base frame serves as a transportation means for the piles, in order to transport the base frame to the set-up location by floating, together with the piles. Thus, separate transportation of the piles to the set-up location on the sea is not necessary. The base frame can be equipped with the piles in the shipyard already.

Instead, it is possible to equip the base frame with the piles only at the set-up location on the sea. This can happen before the base frame is let down, through which pitching the piles into the means for bearing is facilitated compared with the conventional procedure wherein the piles are pitched on the sea floor.

According to one embodiment, the lower building structure has a horizontal underframe. The horizontal alignment of the base frame refers to the stable trim of the lower building structure. The horizontal underframe consists of several frame parts, which are connected to each other on corners of the underframe. The frame parts are preferably straight. The underframe is preferably a rectangular frame. The lower building structure is set down on the sea floor with the underframe. With relatively small constructional expense, the horizontal underframe forms a stable base of an offshore platform.

The lower building structure is preferably configured as a buoyancy body. For this purpose, it is altogether hollow or has several hollow chambers (buoyancy cells). The hollow chamber is preferably at the same time the tank which can be flooded in order to let the building structure down. According to another embodiment, the lower building structure is an open frame construction on which one or plural tanks are fixed which serve as buoyancy cells and can be flooded for letting down the base frame.

According to a further embodiment, the lower building structure comprises several tanks, which are disposed in an offset to each other in a horizontal plane, and the means for flooding are configured such that the different tanks can be purposefully flooded to different extents. This permits to trim the base frame when it is let down. In case that the base frame sinks faster at one side, this can be compensated by reduced flooding of a tank at the same side, or greater flooding of a tank at the opposite side of the lower building structure, respectively. Also, this permits to set down the base frame at local elevations of the sea floor at first, in order to flatten them and to set the base frame down on the flattened sea floor in a substantially horizontal manner. When letting down, the base frame can arrive in an indifferent or substantially indifferent state from out the stable trim. However, by purposeful flooding the different tanks, the base frame can be let down in the desired orientation.

According to one embodiment, the means for bearing the piles comprise the piles on the sides. As a consequence, the piles are enclosed by the base frame when they are driven into the sea floor. Thus, there is a separation between the surrounding sea water and the piles. As a consequence, a noise reduction can be anticipated.

According to one embodiment, the means for bearing the piles feature towers that project upward from the lower building structure, each one having a lower and an upper opening, a passage between the upper and the lower opening, and an upper and a lower bearing for one pile. The pile can be inserted into the passage through the upper opening, and it can be let down through the lower opening. Through this, stable means for bearing piles in vertical alignment are realised with relatively small constructional expenditure.

According to an advantageous embodiment, each of the towers has one further tank. When the further tank is not filled with water, the further tank acts as a further buoyancy cell. This is advantageous in letting down by flooding the tanks in the remaining parts of the lower building structure.

In particular, an indifferent condition of the building structure can be avoided by the further tanks in the towers, which could otherwise occur when the remaining parts of the building structure dip into the water.

The towers can be configured as an open frame construction. The further tanks can be fastened on the latter. According to a preferred embodiment, the towers have closed side walls, a closed bottom wall with the lower opening of the lower bearing therein, a pressure seal in the lower bearing, and there is a cavity in the tower around a pile that is beared therein. Due to this embodiment, water cannot enter into the cavity of the tower through the lower opening. The cavity forms the further tank.

According to one embodiment, the base frame has means for freeing the at least one tank. With the aid of the means for freeing, water that enters the tanks can be removed before the base frame is purposefully let down. Further, with the aid of the means for freeing, water can be removed from the tanks of the towers when the base frame is let down or before an inspection.

According to a further embodiment, the towers are disposed at the corners of the underframe. By doing so, the distances between towers and the stability of the base frame are at maximum. Further, the towers can connect neighbouring frame elements with each other.

The base frame has preferably three, four or more towers. Alternatively, the base frame has only one single tower, which is disposed centrally with respect to the underframe, e.g.

According to one embodiment, the base frame has means for fixing the piles in the means for bearing the piles and/or means for braking a lowering motion of the piles with respect to the lower building structure. With the aid of the means for fixing, the piles can be fixed in the means for bearing during the floating transportation to the set-up location. The piles are preferably fixed in the means for bearing in a position wherein they do not project from the downside of the lower building structure. Through this, it is possible to let the lower building structure down at the set-up location without prior lifting of the piles, such that it is seated on the sea floor with its bottom side. Thus, it is avoided that the piles permeate into the sea floor before the lower building structure is seated on the sea floor. Prior permeation of the piles into the sea floor would be connected with the risk of wrong alignment of the piles that could obviate the complete lowering of the base frame onto the sea floor. With the aid of the means for braking a lowering movement of the piles, the lowering movement can be decelerated. This is advantageous for controlled and uniform anchoring of the piles in the sea floor.

According to a further embodiment, the means for fixing and the means for braking are clamping devices which are fastened on the building structure and act on the piles. According to a further embodiment, the clamping devices are integrated into the means for bearing. They are preferably integrated into the towers. According to a further embodiment, the clamping devices engage on the piles between the upper and the lower bearings of the means for bearing. According to a further embodiment, the clamping devices have gripping jaws which can be clamped together around the piles.

In a further embodiment, there are means for connection with the legs of a platform. The means for connection with the legs of a platform are preferably present at the upper ends of the piles. According to a further embodiment, the means for connection are tubular ends of the piles, into which lower ends of legs of a platform can be inserted. According to a further embodiment, the means for connection are additional leg mating units, which are mounted to the upper ends of the piles at their lower sides and are mountable to the lower ends of the legs at their upper sides. According to another embodiment, the means for connection with the legs of a platform exist at the upper ends of the towers.

According to a preferred embodiment, the base frame is configured such that the towers project upward with their upper ends from the water surface area on the set-up location at a certain water level according to water level analysis, or are disposed in the close range below the water surface area and/or a pile foundation can be made in the sea floor by means of the piles at said water level, and the piles project upward up to beyond the water surface area with their upper ends, or are disposed in the close range below the water surface area. This embodiment has the advantage that an interface for the platform to be installed is disposed above the water surface area or in the close range below the water surface area at the certain water level. Thus, the connection of the legs of the platform with the base frame can be made in the visual range and under particularly favourable conditions. Diving robots or divers are not necessary for this. The works can be done from out work rafts which are positioned next to the upper ends of the towers and/or piles.

The towers and/or piles project out of the water surface area for at most 6 meters, further preferably for at most 3 meters, further preferably for at most 1.5 meters.

Connection positions disposed under the water surface area are preferably disposed in the visible range below the water surface area. The visible range is the range below the water line that can be seen by an emmetropic adult human being with the naked eye. In case of a surface below the water line, the visible range can be extended by suitable measures.

This is done by elements fastened on the base frame, which are visible above the water line and permit to identify the position of the interface. The embodiment can be implemented by marks in the form of rods or tubes which are guided from out the base frame up to above the water line, and thus define the position of the interface.

Preferably, the connection positions disposed below the water surface area have a distance of at most 6 meters from the water surface area, further preferably of at most 3 meters from the water surface area, further preferably of at most 1.5 meters from the water surface area.

The certain water level according to water level analysis is preferably the water level MW (middle water) or the LAT (lowest astronomical tide), which is also called NGzW in German, or the HAT (highest astronomical tide) also called HGzW in German, or another defined water level from the tide knowledge. Depending on the time slot which is needed for the connection of base frame and platform, a suitable water level can be selected which is made the basis for dimensioning the base frame. The water level analysis yields the respective water levels for given installation times.

According to one embodiment, the base frame has a cable tower that projects upward from the lower building structure. The cable tower serves for guiding sea cables from the sea floor upward to the platform, or respectively for guiding them down from the platform to the sea floor and to protect them.

In a further embodiment, the cable tower comprises a bundle of single tubes. The single tubes can serve as J-tubes for the sea cables and they can ensure the necessary stability of the cable tower.

According to a further embodiment, the cable tower is disposed outside of the building structure and connected to it on the side. Thus, guiding sea cables to the cable tower is not hindered by the building structure.

According to a further embodiment, the building structure has a buoyancy body for trim compensation in the vicinity of the cable tower. The buoyancy body compensates the weight of the cable tower in the floating transportation of the base frame.

According to one embodiment, the base frame has a control stand on at least one tower, from out which the means for flooding can be controlled. According to a further embodiment, the lower building structure has measurement devices for acquiring the trim position of the lower building structure, and the control stand has means for displaying the detected trim position.

According to one embodiment, the base frame has means for remote control of the means for flooding by way of a remote control device that is remote from the means for flooding, and/or it has measurement devices for determining the trim position of the building structure and means for transmitting the measurement results to a display device that is remote from the measurement devices. Thus, it is possible to command the lowering of the base frame safely and to monitor the respective alignment of the base frame when it is being let down. The means for remote control and/or the means for transmitting are wire-bound and/or wireless means for remote control and/or for transmitting. The remote control device and/or the means for displaying can be disposed on the control stand or on an external location. The latter is for instance on an accompanying ship.

According to a further embodiment, there are means for connecting the piles to the means for bearing by positive fit, and/or means for connecting the piles to the legs of a platform by positive fit. According to a further embodiment, the means for connecting by positive fit are preferably grout connections. In this, it is dealt with liquid concrete, artificial resin, or any other curing material which can be pressed into a shape. It is brought into the joining area of the piles and of the means for bearing and/or of the piles and the legs in order to connect them by positive fit after the curing. In addition or instead of this, a connection by positive fit can be made by welding and/or screwing the parts together.

The method of the present invention which is suitable for installing a base frame for an offshore platform comprises the following steps:
  the base frame is built,
  the base frame is transported to the set-up location on the sea in a self-floating manner,
  the base frame is flooded and let down to the sea floor,
  the base frame is anchored on the sea floor by means of piles.

The advantages of the subsequent embodiments of the method have been explained above by reference to embodiments of the base frame.

According to one embodiment of the method, the base frame is equipped with piles before the transportation to the set-up location, and is transported to the set-up location with the piles in a self-floating manner.

According to a further embodiment, an alignment of the base frame takes place when it is being let down, by purposeful control of the water amounts which flow into the different tanks in the flooding.

According to a further embodiment, the base frame is stabilized by means of pontoons and cable winches disposed thereon when it is being let down. The base frame is preferably veered down between two neighbouring pontoons in a controlled manner.

According to a further embodiment, the base frame is at first set down on local elevations of the sea floor. Uneven parts of the sea floor can be made flat by this.

According to a further embodiment, the piles are driven into the sea floor by gravity and/or by ramming after the base frame has been set onto the sea floor.

According to a further embodiment, the lowering of the piles is controlled by braking.

According to a further embodiment, the base frame and the piles are installed on the sea floor such that the upper ends of the piles and/or of the towers project upward above the water surface area or are disposed in the close range below the water surface area.

According to a further embodiment, the piles are connected to the base frame with positive fit after having been driven into the sea floor.

In this application, the designations "up" and "down" refer to the arrangement of the offshore platform with the base frame below the platform, the piles and the legs being upright standing.

The present invention will be explained in more detail by way of the attached drawings of an example of its realisation.

BRIEF DESCRIPTION OF THE SEVERAL VIEWS OF THE DRAWINGS

In the drawings show.

FIG. 16 the interface between a pile and a leg before the connection is produced, in a side view;

FIG. 17 the same interface after the connection has been produced, in a side view;

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
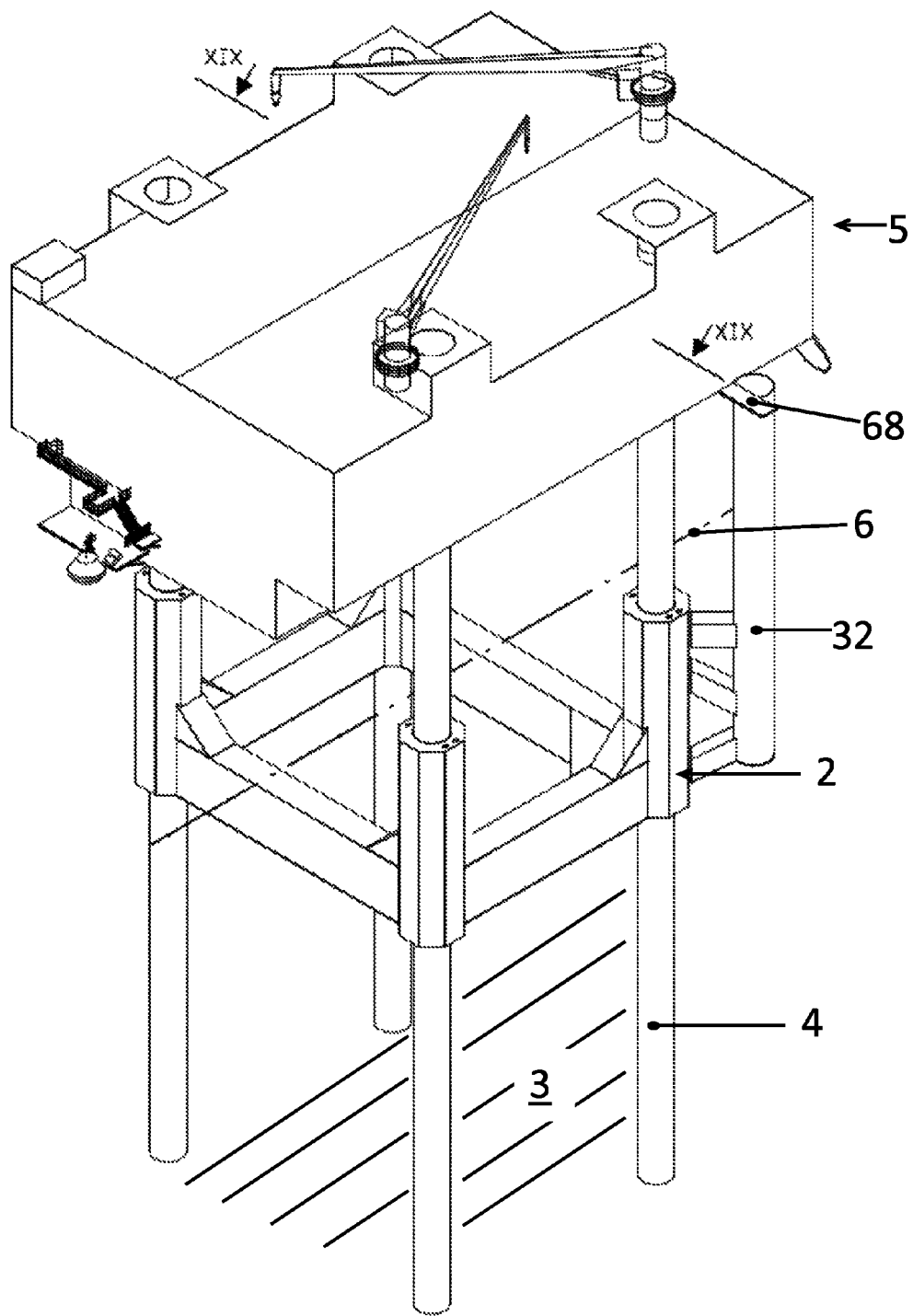
FIG. 1 an offshore platform, consisting of base frame and a platform topside, in a perspective view diagonal from above and from the side.
Figure 20:
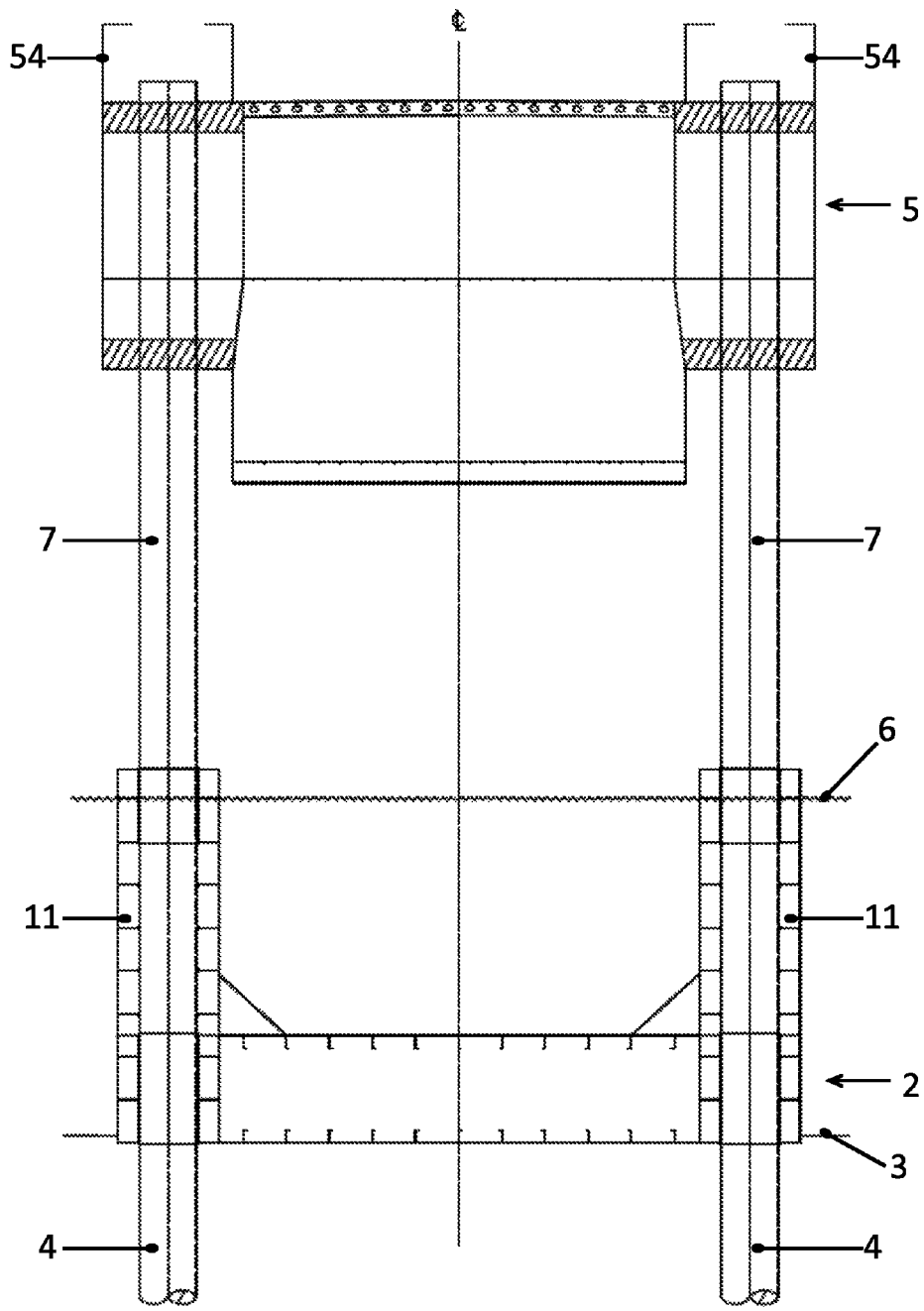
FIG. 20 the offshore platform after the platform topside has been lifted with respect to the legs, in a vertical section.

According to FIGS. 1 and 20, an offshore platform 1 comprises a base frame 2 which is set down to the sea floor 3. Together with piles 4, the base frame 2 forms the foundation structure of the offshore platform 1. The piles 4, also called "nails", are driven into the sea floor 3 in order to produce a pile foundation and to anchor the base frame 2 on the sea floor 3. The piles 4 serve to guide down loads from a platform topside 5. The piles 4 are preferably circular cylindrical. They are preferably hollow cylindrical.

The platform topside 5 is a support structure, which is disposed in the region above the surface area 6 of the water and remote from the influence range of the motion of the sea.

The platform topside 5 is supported on the foundation structure via legs 7. At the upper side, each of the legs 7 is bound into the structure of the platform topside 5, and at the downside it is connected to a pile 4. The legs 7 are preferably circular cylindrical. They are preferably hollow cylindrical.

Figure 2:
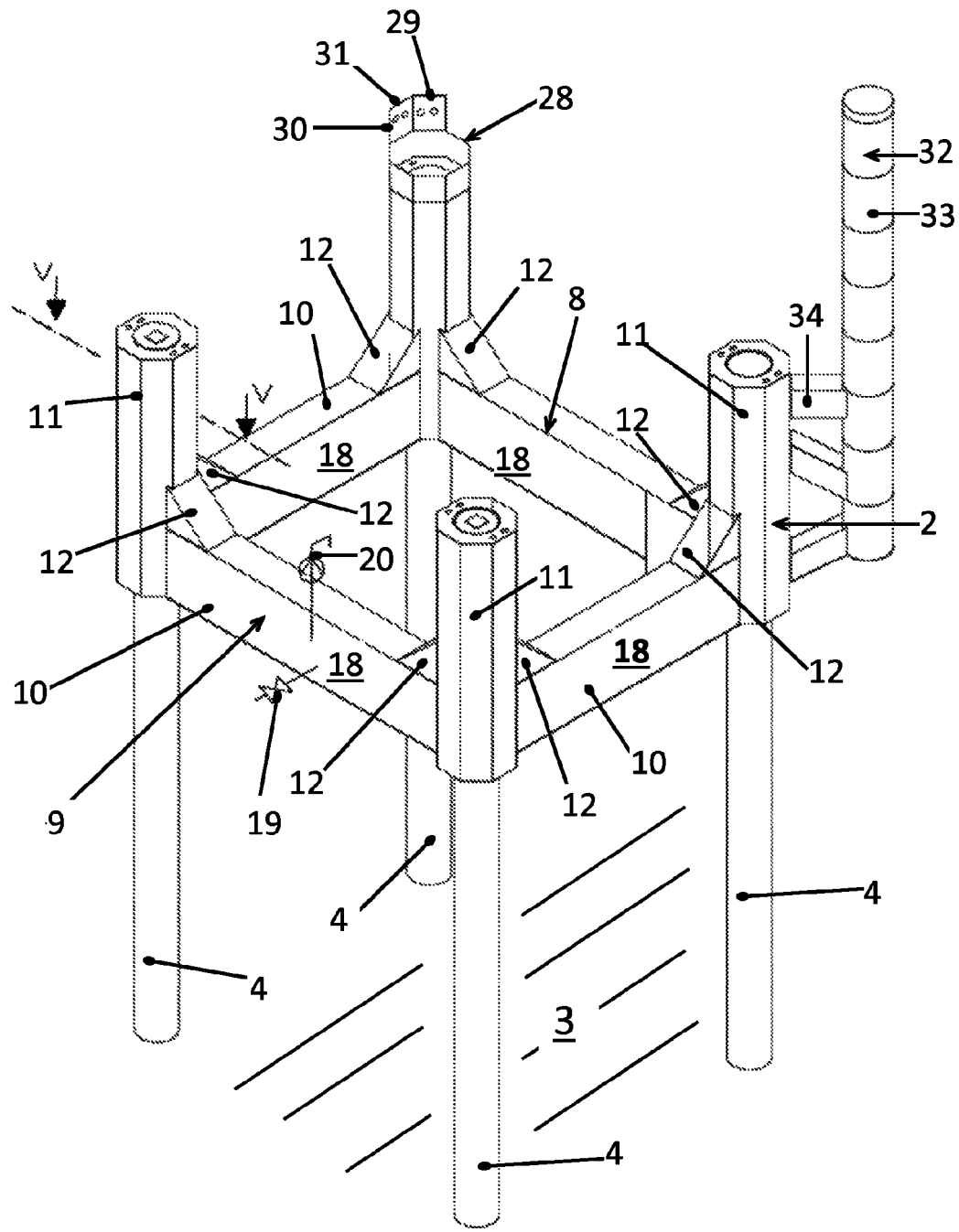
FIG. 2 base frame of the offshore platform with piles let down, in a perspective view diagonal from above and from the side.
Figure 3:
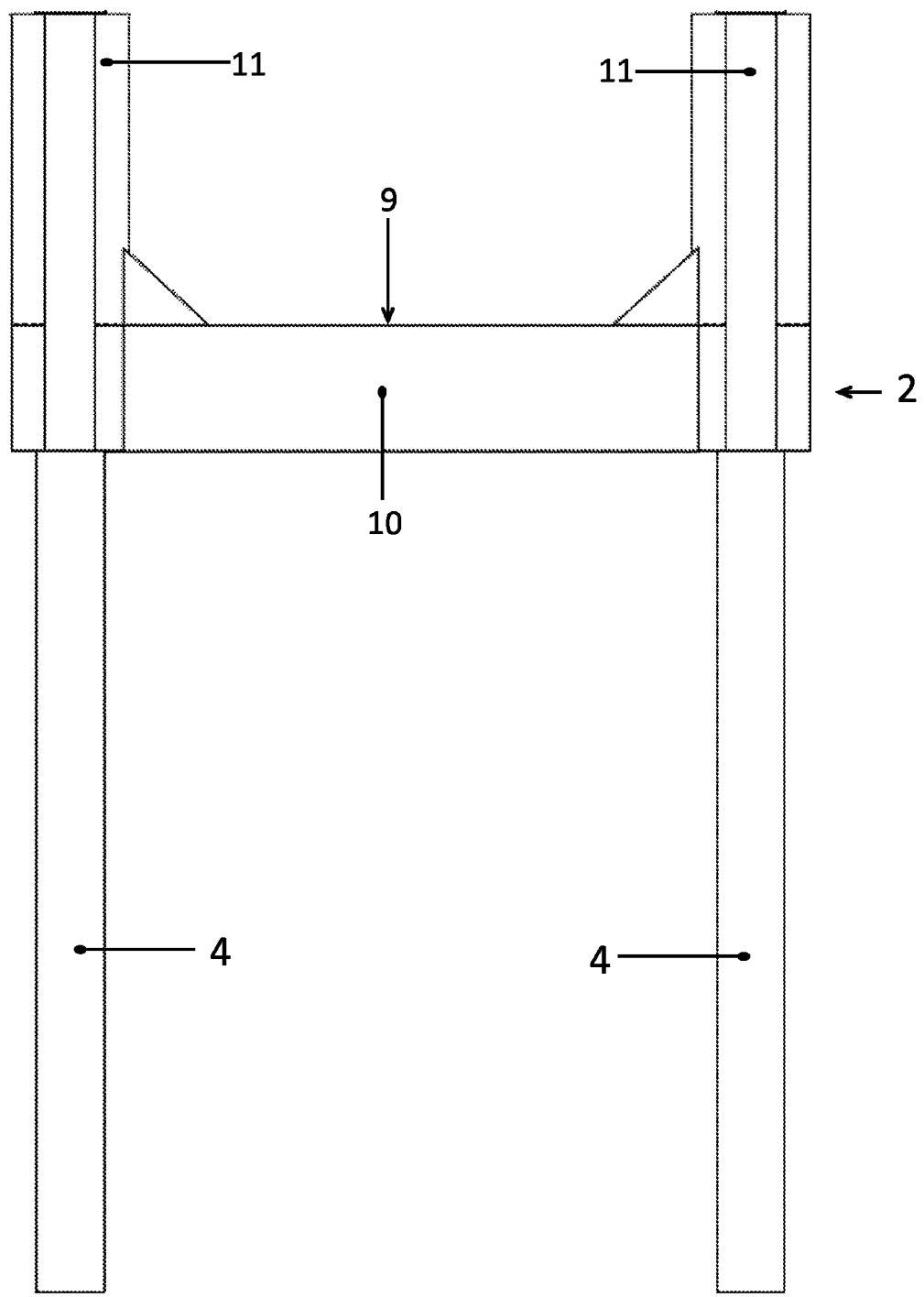
FIG. 3 the base frame in the same condition, in a side view.
Figure 4:
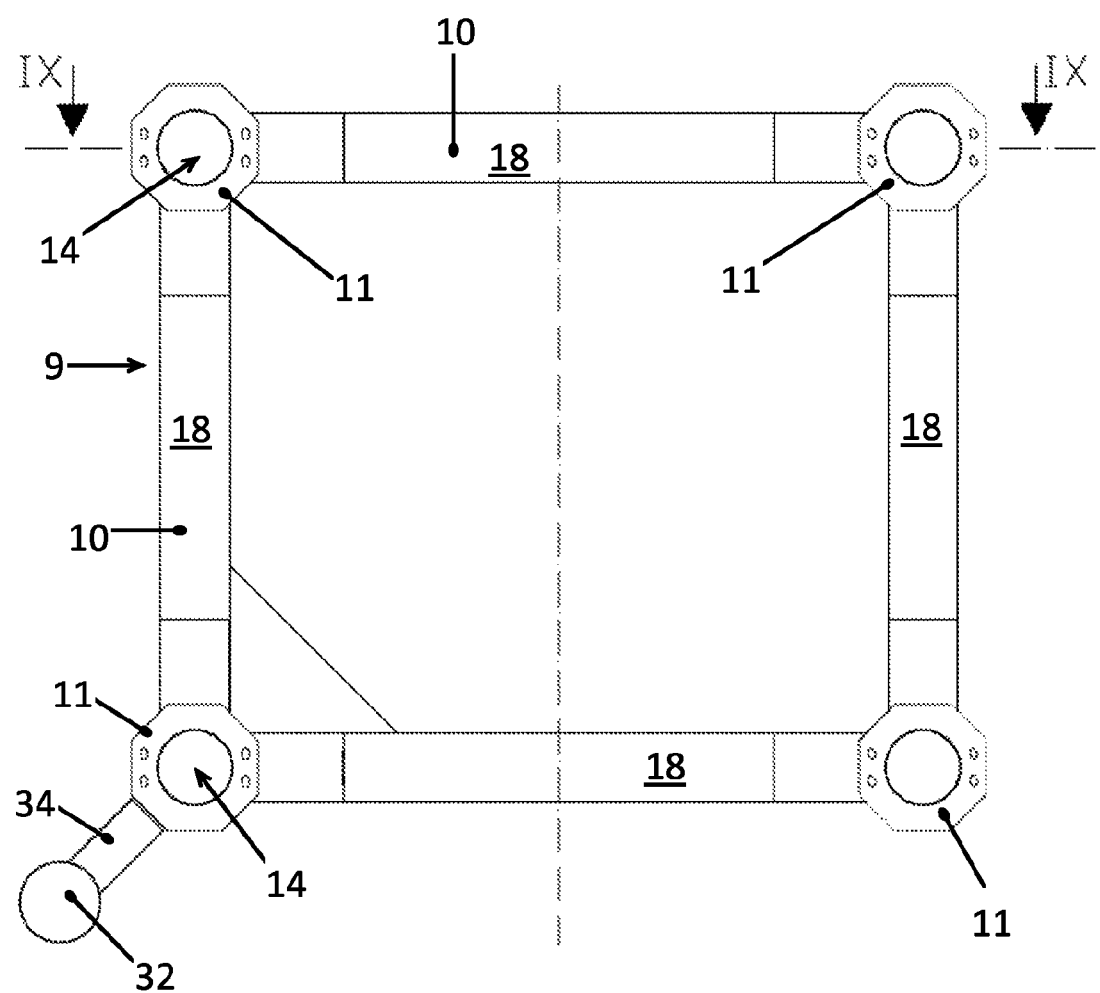
FIG. 4 the base frame in a top view.

According to FIGS. 2 to 4, the base frame 2 has a building structure 8, which comprises a horizontal, rectangular underframe 9. The underframe 9 has four linear frame parts 10.

Four towers 11 project upward from the frame 9. At the downside, the towers 11 are flush with the lower side of the underframe 9. The towers 11 are hollow bodies. In the example, they have an octagonal cross section. Each tower 11 is situated at a corner of the underframe 9, and at the same time it forms a connection element between two neighbouring frame parts 10. On each end at the upside, the frame parts 10 carry support elements 12, which supports the towers 11 on the sides.

At the lower end, each of the hollow cylindrical towers 11 has a circular lower opening 13, and at the upper end a circular upper opening 14, so that a pile 4 can pass through it.

Figure 5:
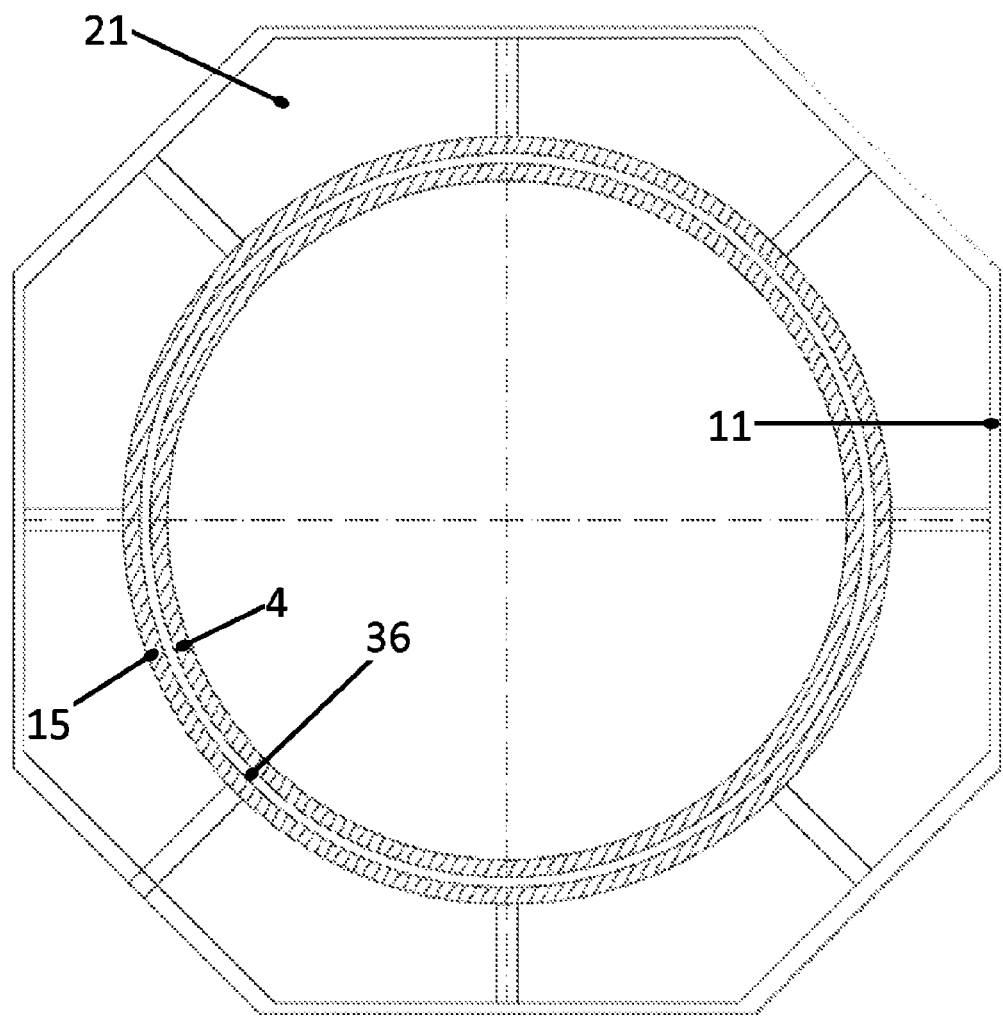
FIG. 5 a tower of the base frame with pile set in, in a horizontal section.
Figure 6:
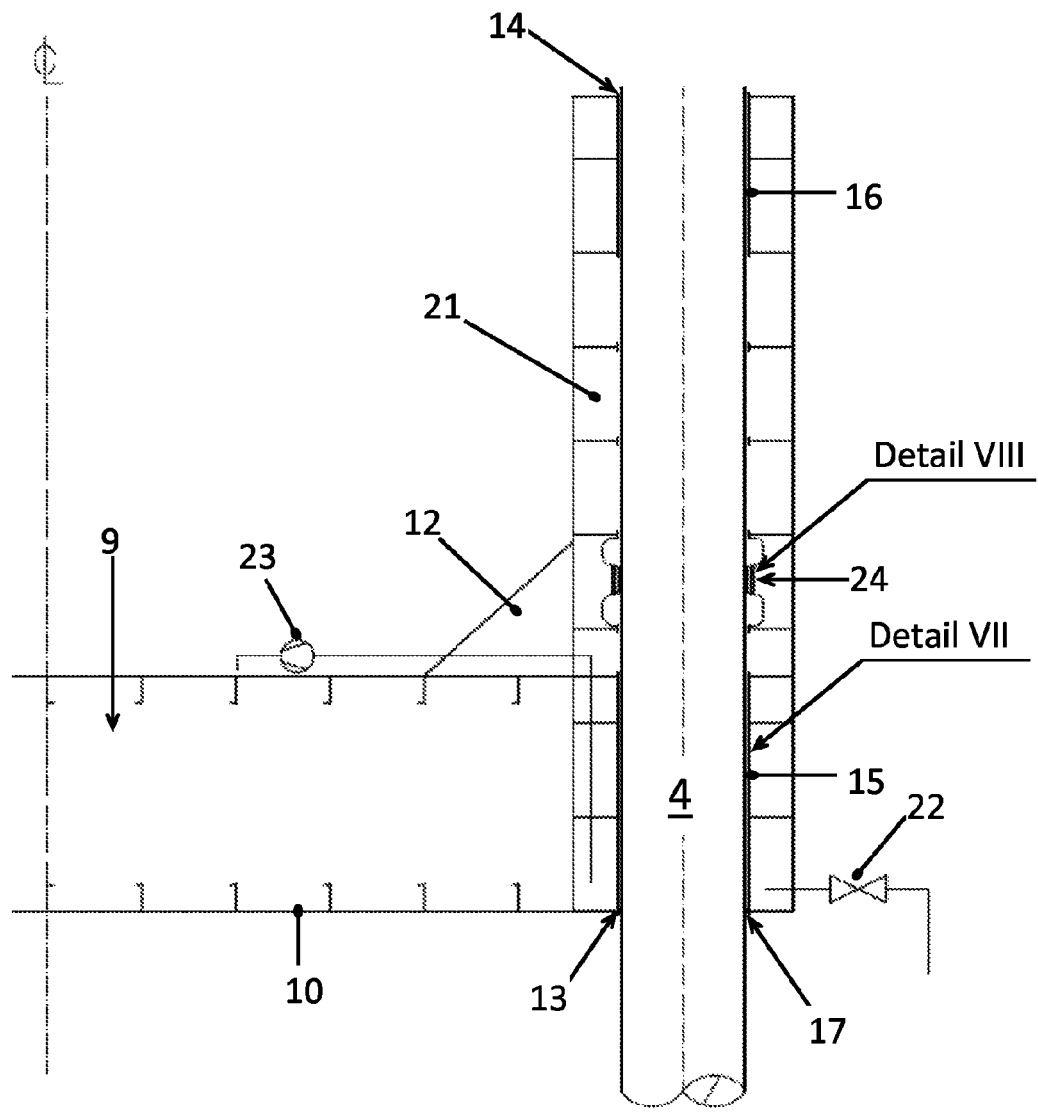
FIG. 6 the tower with pile set in, in a vertical section.
Figure 7:
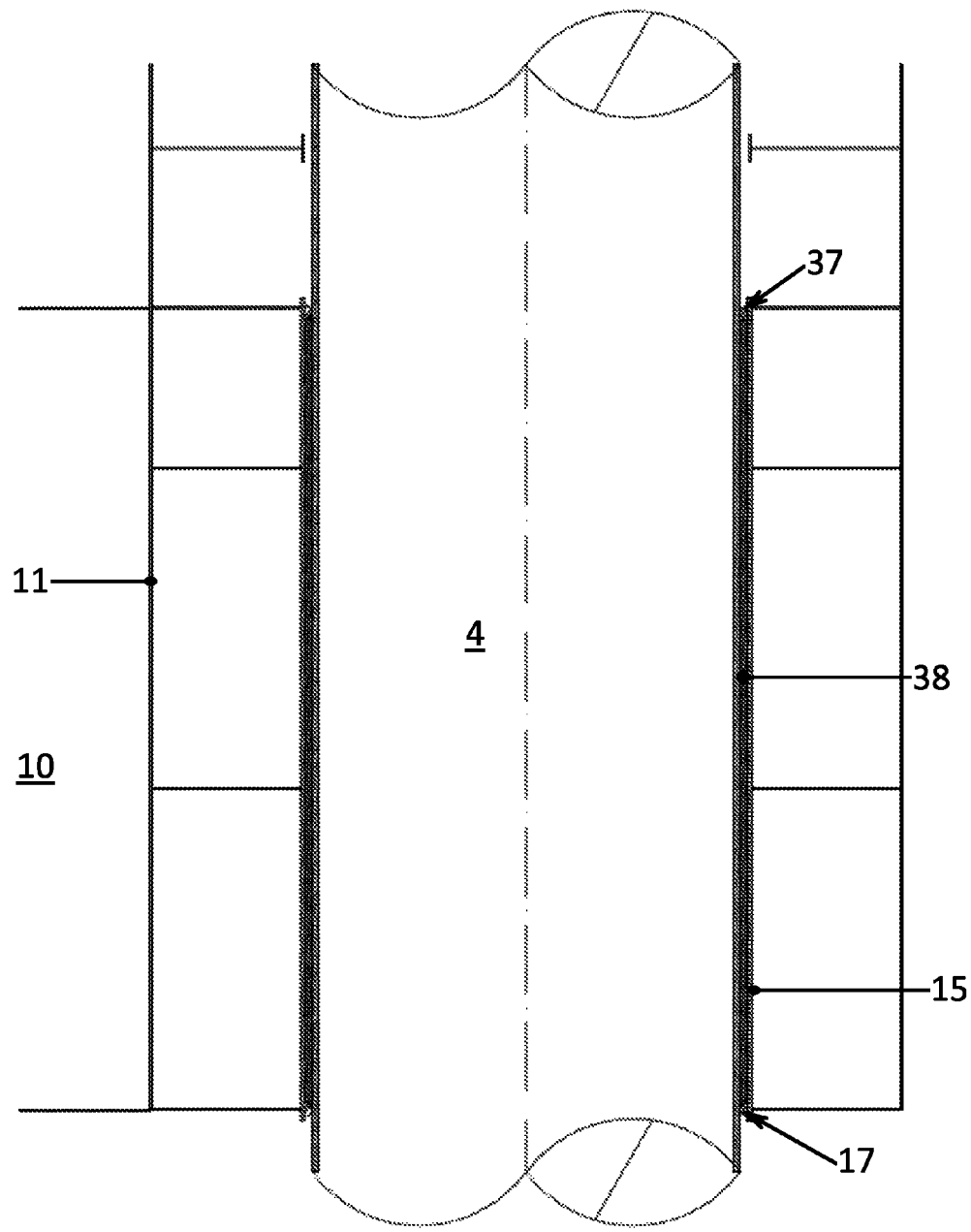
FIG. 7 lower bearing of the tower with pile set in, in the vertical section.

According to FIGS. 5 and 6, each tower 11 comprises a sleeve-shaped lower bearing 15 that follows the lower opening 13, and a sleeve-shaped upper bearing 16 that follows the upper opening 14. In the lower bearing 15, there is a pressure seal 17 for sealing the lower bearing 16 with respect to the pile 4.

The lower building structure 8, consisting of underframe 9 and towers 11, is a naval steel construction from boards and profiles. The boards and profiles are welded together.

In the interior of the lower building structure 8, there are several separate tanks 18. In the example, one separate tank 18 is disposed in each frame part 8. Each tank 18 is connected to means for flooding 19 and means for freeing 20, by which each tank can be flooded and freed separately. The means for flooding 19 are suitable valves. The means for freeing 20 are detachable pumps with associated ducts.

According to FIGS. 5 and 6, a cavity, sealed on the sides and at the downside, exists in each tower 11 around the pile 4 when the pile 4 is held in the lower and upper bearings 15, 16. The cavity forms a further tank 21. This can in turn be flooded and freed via separate further means for flooding 22 in the form of valves, and further means for freeing 23 in the form of pumps and associated ducts.

Figure 8:
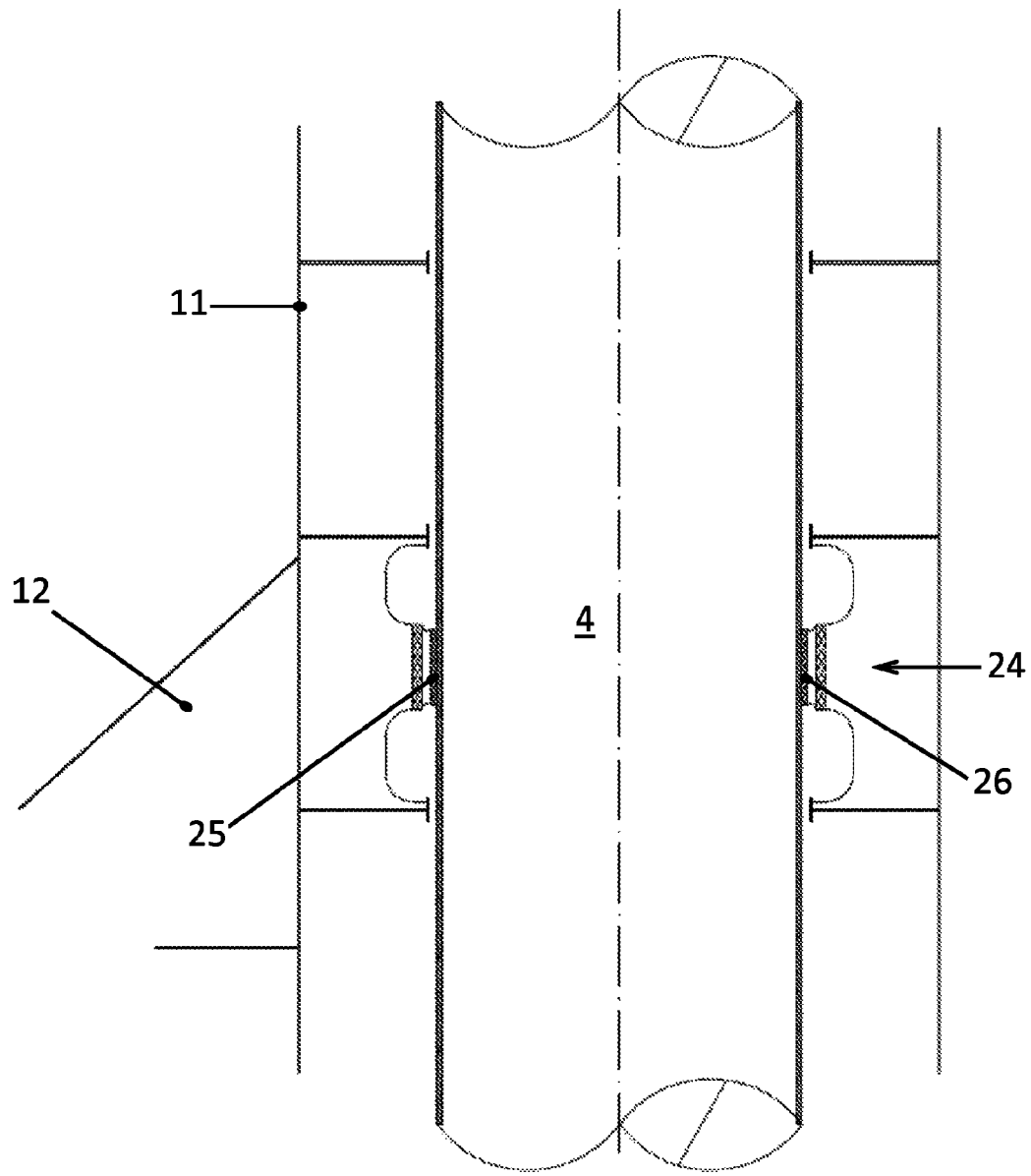
FIG. 8 clamping device of the tower with pile set in, in the vertical section.

Further, according to FIGS. 6 and 8, means 24 for fixing and braking a pile 4 in a vertical position exist in each tower. This may be a mechanical or hydraulic device, which keeps the piles in position by positive or non-positive fit. According to FIG. 8, it is dealt with gripping jaws 25, 26, which rest on a horizontal bearing 27 and enclose a pile 4 on different sides. By drawing the gripping jaws 25, 26 together, the pile 4 can be fixed, so that it is not displaced downward with respect to the tower due to its proper weight. The piles 4 can be let down in a controlled manner by releasing the braking device.

The tanks 18, 21 are dimensioned such that they assure the buoyancy for the floating transportation of the base frame 2 including the piles 4 in their empty condition. The base frame 2 is self-floating and has a stable trim. It has no buoyancy from its own.

According to claim 2, there is a control stand 28 on the upper side of at least one tower 11. The means 19 for flooding are connected to means 29 for controlling the means for flooding in the control stand 28.

Moreover, there are measurement- and display devices 30, 31 in the control stand for determining and displaying the trim of the building structure 8.

In addition, the base frame comprises a vertical cable tower 32, which is formed from a bundle of individual tubes 33. The cable tower 32 is disposed outside of the frame 9. At the side, it is connected to a tower 11 via struts 34.

In order to compensate the weight of the cable tower 32, the underframe 9 is provided with a prism-shaped buoyancy body 35 in the neighbouring corner. The buoyancy body 35 stabilizes the underframe 9 at the same time.

The height of the towers 11 is matched to the tide at the set-up location, so that the upper ends of the towers 11 project upward from the water at the time when the offshore platform 1 is being installed.

In one example, the length of the frame is 47.5 meters, and its width on the main deck is 41.5 meters. The base frame is envisioned for a set-up location with a lowest astronomical tide LAT of 24 meters. The height of the towers 11 is 25.5 meters, so that the towers 11 stand out from the water on the set-up location at normal states of the sea, for instance at moderate state of the sea.

The cable tower 32 is dimensioned such that it reaches up to the platform 5. In the example, its length is 40 meters.

The piles 4 are hollow cylindrical. They are preferably closed at the downside during the transportation, and are opened at the downside for driving in. According to FIGS. 16 to 18, the piles 4 have an opening 35 at the upper side, into which a leg 7 can be introduced.

The base frame 2 is produced in a building dock of a shipyard.

During the building phase, the equipment including the means for flooding and for freeing (19, 20, 21, 22) and optionally the piles 4 are installed in the base frame 2. With the aid of a (full gantry)-crane, the piles 4 can be set easily into the lower and upper bearings 15, 16 of the towers 11 in the building dock, and be fixed therein in an initial position by means of the gripping jaws 25, 26 in which they do not project out of the underframe 9.

The cable tower 32 is optionally built on in the building dock.

Figure 9:
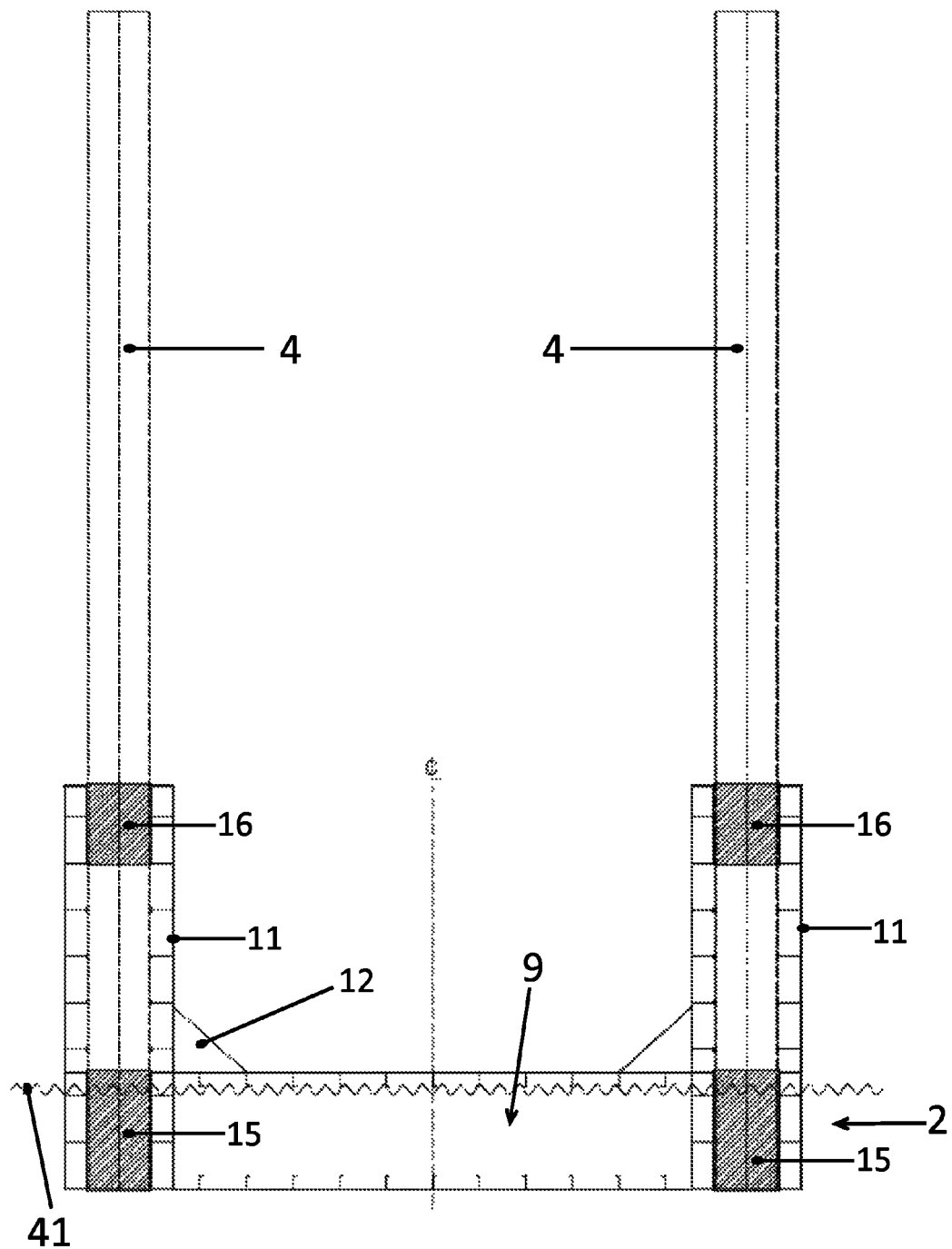
FIG. 9 the base frame with piles in lifted initial position in the floating condition, in a vertical section.

After the complete mounting of all the components, the base frame 2 is made to float in the building dock and hauled to the fitting-out pier for final fit-out and try-out. After constructional approval, there is the transit of the base frame 2 to the set-up location in a towing train, with corresponding temporary navigation lights. The floating condition is shown in FIG. 9.

As the case may be, the sea floor 3 is prepared before the base frame 2 is set up, when it has too great unevenness. For this purpose, an even plane is made on the sea floor 3, which satisfies the defined tolerances for the installation of the offshore platform 1 and forms a suitable ground for the base frame 2.

The base frame 2 is positioned above the set-up location by sea tugboats. At the set-up location, the tugboats can be held on a given position automatically with the aid of a dynamic positioning system. For instance, the DP2 system can be used.

Flooding of the tanks 18, 21 is done manually via the command stand 28 of the base frame, according to the trim that is indicated by the display device 31.

If necessary, the tanks 18, 21 can be flooded by remote control. The trim is monitored by the measurement devices 30 on the base frame 2, and in case, the measurement results are transmitted to a place outside of the base frame 2, from out which place the flooding is remote controlled.

After the base frame 2 is seated on the sea floor, the piles 4 are let down using the gravity. The gripping jaws 25, 26 are controlled from out the command stand 28 in order to do this. As the case may be, the lowering of the piles 4 is braked with the aid of the gripping jaws 25, 26. Due to their intrinsic weight, the piles 4 penetrate into the sea floor 3 only partially. In addition, they are driven into the sea floor 3 by pile hammers which are set onto the piles at the upside.

Figure 10:
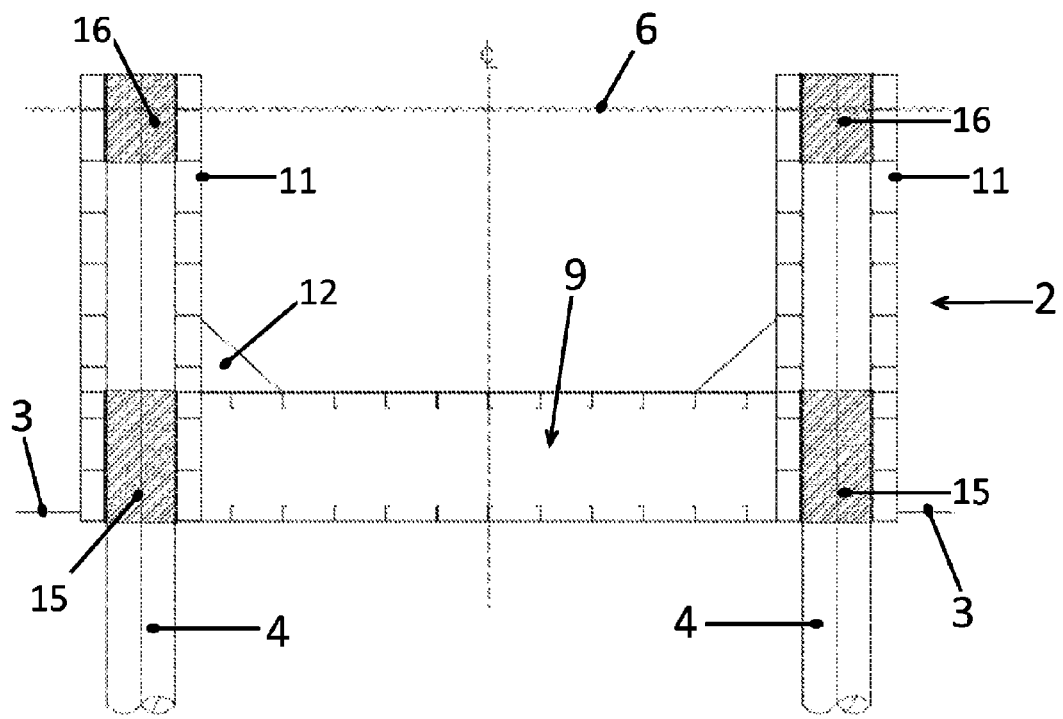
FIG. 10 the let down base frame with piles driven into the sea floor, in a vertical section.

The bearing of the piles 4 in the towers 11 serves for guiding the piles 4 when they are being driven in. The piles 4 are driven into the sea floor 3 until their upper ends are flush with the upper ends of the towers 11. This is shown in FIG. 10.

Thereafter, the piles 4 are connected to the base frame 2 by positive fit. The positive fit takes place preferably by grouting. For this, liquid concrete or artificial resin or another curing, compressible mass is pressed into a gap between 36 between the pile 4 and the lower bearing 16. The lower bearing 15 is preferably also provided with an upper seal 37, which prevents together with the pressure seal 17 that the grouting material 38 leaks out of the gap 36. By the grouting, the tower 11 is also permanently sealed at the downside.

Thus, at the time of the installation, the upper openings 35 of the piles 4 are located above the water surface area 6 as surfaces for housing the legs 7 in order to carry the platform 5.

Figure 11:
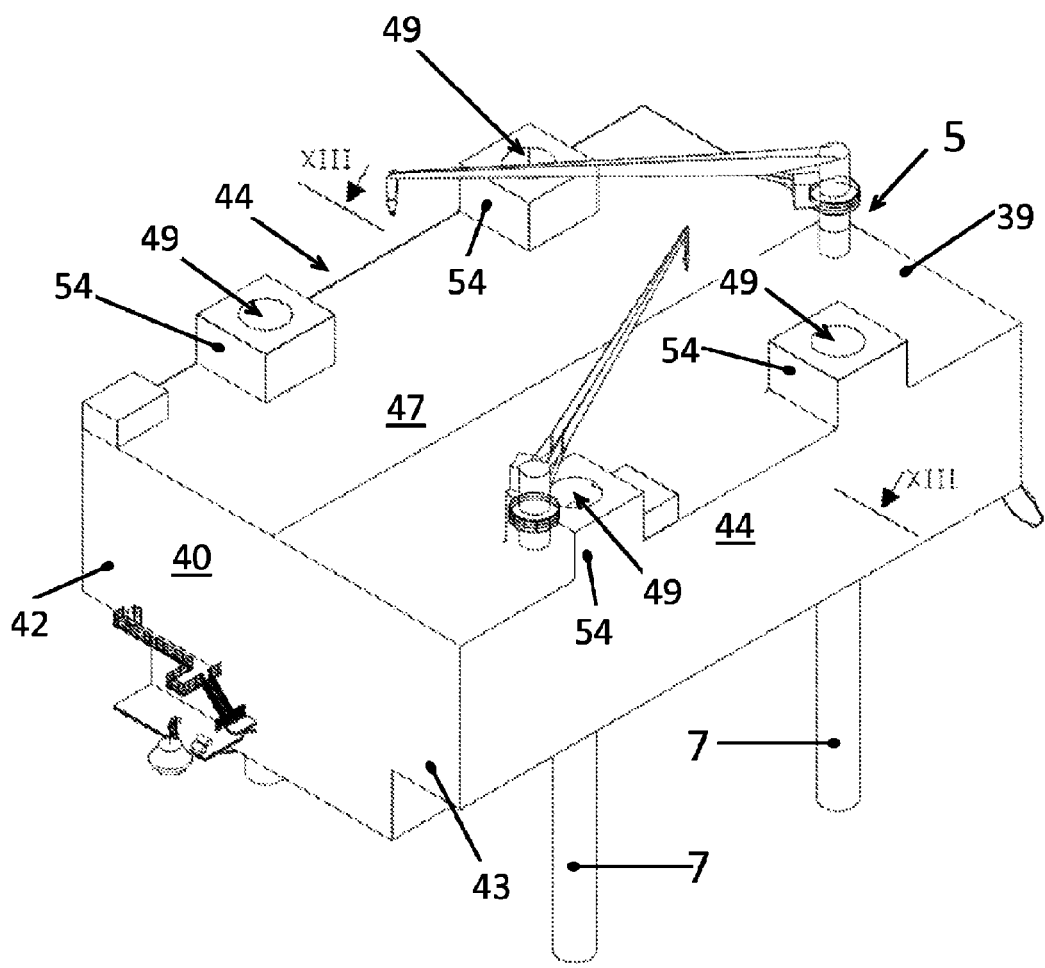
FIG. 11 the platform topside in the elevated condition on the legs, in a perspective view diagonal from above and from the side.
Figure 12:
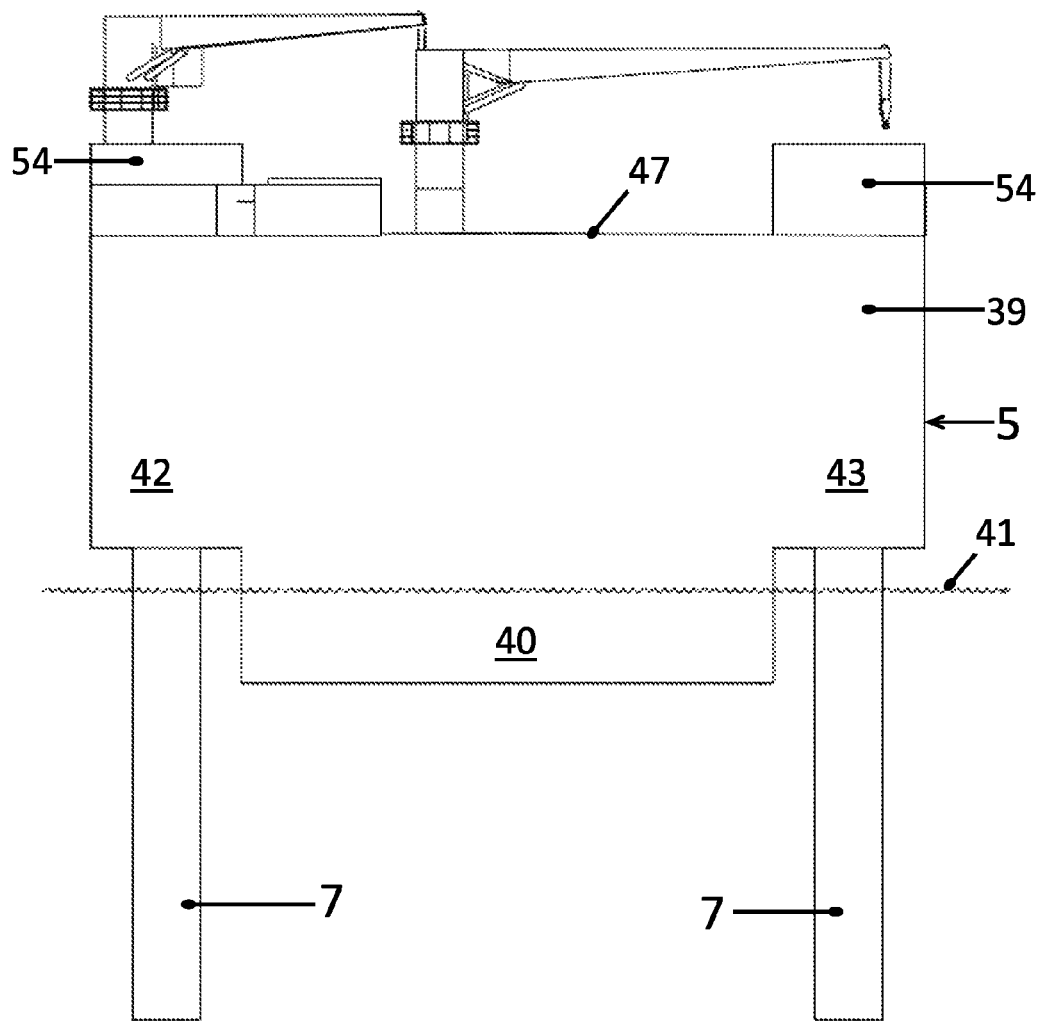
FIG. 12 the platform topside in the same condition on the legs, in a side view.

According to FIGS. 11 and 12, the platform top 5 has an upper building structure 39, which has a box-shaped central part 40 and overhangs 42, 43 above the water line 41, i.e. the floating water line of the platform top 5. Thus, the side walls 44, 45 of the upper building structure 39 are drawn in below the overhangs 42, 43. Through this, the building structure 39 has a symmetric T-shaped cross section (compare FIG. 12), wherein the middle part 40 forms the vertical T-post, and the overhangs 42, 43 form the laterally jutting out timber parts of the horizontal T-timber.

Figure 13:
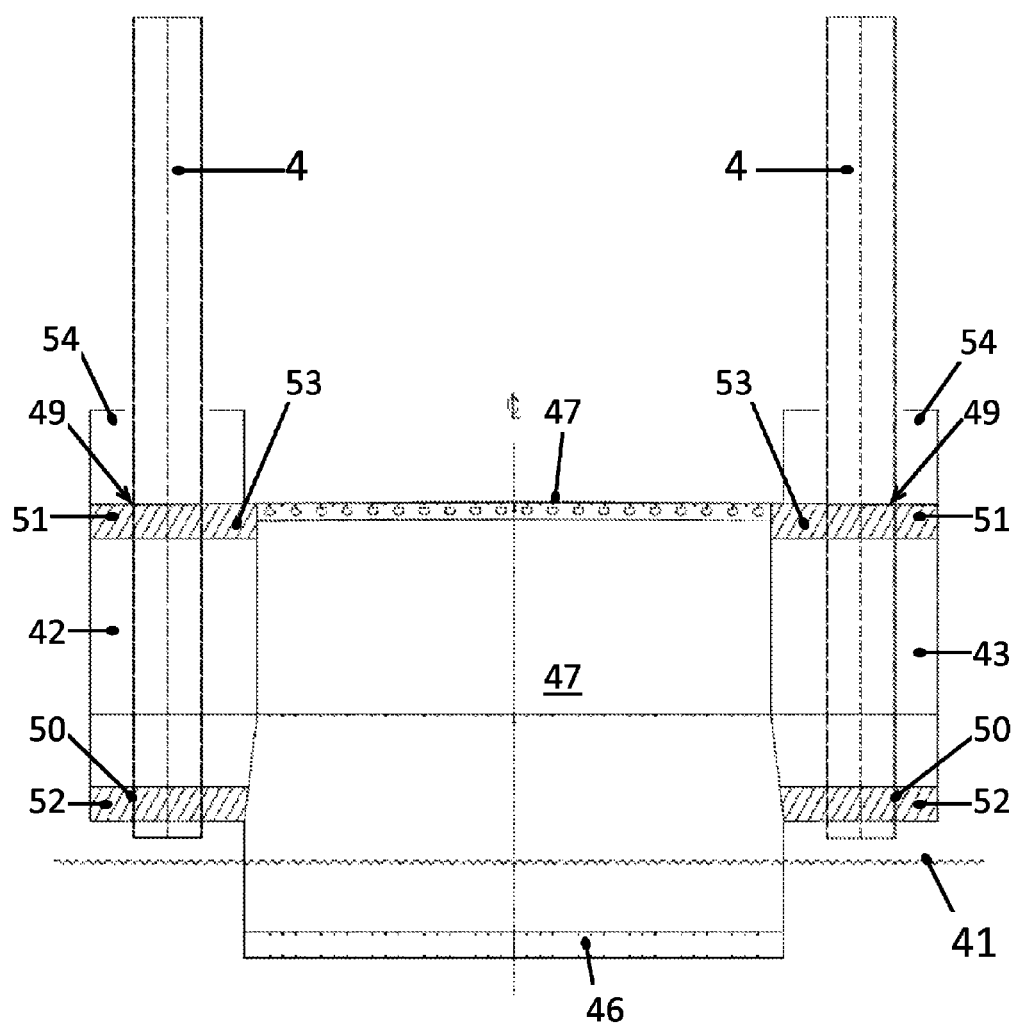
FIG. 13 the platform topside with the legs in elevated initial position in trim, in a vertical section.

According to FIG. 13, the central part 40 is bulkheaded towards the overhangs 42, 43. At the downside, it has a double bottom 46, and at the upper side it is closed by a main deck 47. It contains one or several buoyancy cells 48, which are separated from each other by cross bulkheads.

Means for bearing 49 of the legs 7 are located in the lateral overhangs 42, 43. For each leg 7, there is a lower leg bearing 50 and an upper leg bearing 51, which are aligned with each other. The lower leg bearing 50 is disposed in a bottom wall 52 of the overhang 42, 43, and the upper leg bearing 51 in a deck wall 53 of the overhang 42, 43, which is a lateral stripe of the main deck 47 of the platform top 5. The bottom wall 52 and the deck wall 53 of the overhangs 42, 43 have reinforcement pieces on the lower and upper leg bearings 50, 51. The lower and upper leg bearings 50, 51 are circular through-holes through the bottom wall 52 and the deck wall 53 at the reinforced positions.

The upper building structure 39 is essentially symmetric, also in the longitudinal direction.

Rooms for the crew and service rooms, respectively, can be situated in the upper building structure 39.

Figure 14:
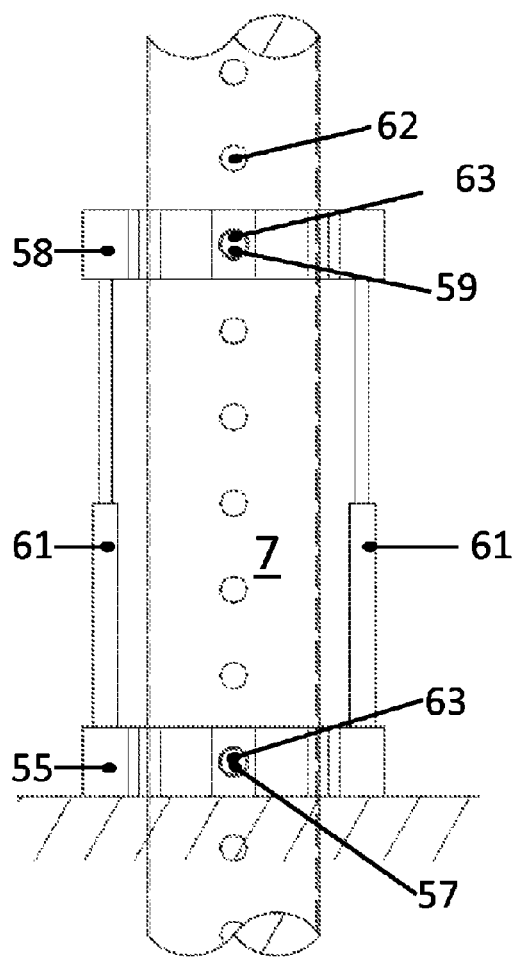
FIG. 14 a jacking system for displacing the legs with respect to the platform topside in a certain position of the legs, in a side view.
Figure 15:
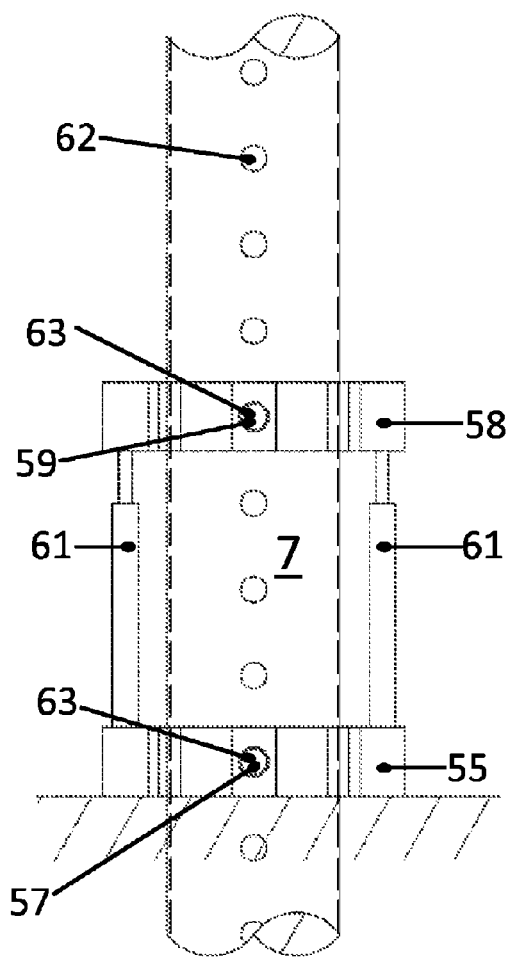
FIG. 15 the same jacking system in a position of the leg that is lower with respect to FIG. 10, in a side view.

A jacking system 54 exists above each upper leg bearing 51, which is shown in detail in FIGS. 14 and 15. The jacking system 54 has a latch 55 which is permanently fixed on the deck. In this, it is dealt with a board with a vertical through hole 56, through which a leg 7 can be guided. Further, the stationary latch 55 has a horizontal hole 57, which extends from an outer side of the stationary latch 55 up to the inner circumference of the vertical through hole 56.

According to FIGS. 14 and 15, the jacking system 54 comprises a movable latch 58. In this, it is also dealt with a board with a vertical through hole 59, which receives a leg 7. Even the movable latch 58 has a horizontal hole 60, which extends from an outer side of the movable latch 58 up to the inner circumference of the vertical through hole 59.

Further, the jacking system 54 has hydraulic cylinders 61, which are fixed on the stationary latch 55 at their downside, and on the movable latch 58 at their upper side. By means of the hydraulic cylinders 61, the movable latch 58 can be lifted or let down vertically. Of course, a hydraulic control device and a supply with pressurized hydraulic medium are associated to the hydraulic cylinders 61.

Each leg 7 is provided with a series of horizontal blind holes 62. When the jacking system 54 is not in function, the leg 7 is locked on the platform topside 5, by plugging a bolt 63 into the horizontal hole 57 of the stationary latch 55 and into a horizontal blind hole 62 of the leg, so that it cannot be displaced in the axial direction.

The jacking system 54 is a pin in hole system. Alternatively, a strand jacking system can be provided.

The buoyancy cells 48 are dimensioned such that the upper building structure 39 is self-floating when the legs 7 are beared in the means 49 for bearing the legs and are fixed by means of the jacking systems 54. The water line 41 is below the overhangs 42, 43 in this.

Further, the platform topside 5 is designed such that it has a stable trim when the legs 7 are inserted into the lower and upper leg bearings 50, 51 and do not project beyond the overhangs 42, 43 at the downside. The width of the water line 41 of the upper building structure 39 is preferably designed such that it is not necessary to take up ballast in the floating transportation of the upper building structure 39.

The weight distribution of the platform topside 5 is approximately homogeneous. It is therefore not necessary to use trimming tanks in order to keep the platform topside 5 in a stable trim. But if this is necessary, trimming tanks can be used also.

The platform topside 5 is self-floating and has no proper drive. Thus, transportation on a barge is not necessary.

For instance, the platform topside has a length of 73 m, a width on the main deck of 49.5 m, at the downside a width of 31.5 m and a height from the lower edge to the deck of 26.5 m.

According to FIGS. 16 to 17, the diameter of the legs 7 exceeds the inner diameter of the upper opening 35 of the piles 4 in a short distance from their lower end. There, each leg 7 has a shoulder 64, below which its outer diameters is smaller to a certain extent than the inner diameter of the piles 4. At the bottom, the legs 7 have a portion 65 in the form of a truncated cone.

With the portion 65 in the form of a truncated cone, the leg 7 can be easily put into the upper opening 35 of a pile 4, until the shoulder 64 rests on the upper edge of the pile 4. A hollow cylindrical gap 66 remains between the portion with reduced diameter of the leg and the pile.

In the example, the length of the legs 7 is circa 45 m.

The platform topside 5 can be built in a building dock of a shipyard.

In the building phase, the legs 7 are preferably set into the lower and upper leg bearings 50, 51 by means of a (full gantry-) crane, and secured in the lower latches 55 by means of bolts 63.

An at least temporary tightness of the platform topside 5 has to be ascertained for the floating transportation of the platform topside 5.

Thereafter, the platform topside 5 is made to float at the building location and hauled to the shipyard pier for final tackle and testing. In this, the installation of the removable components of the jacking system 54 can take place on the main deck 47.

Thereafter, the platform topside 5 is floating-transported to the installation location in towing train with corresponding temporary navigation lights.

At the installation location, the platform topside 5 is made to float above the base frame 2 and positioned by position adapters or fenders on the base frame 2 at the defined time according to water level analysis with tugboat assistance. In doing so, the base frame 2 can be used as an introducing- and positioning aid.

Thereafter, the legs 7 are located in the overhangs 42, 43 exactly above the associated piles of the base frame 2.

Thereafter, the legs 7 are set down onto the piles 4 by means of the jacking systems 54, so that the legs 7 engage into the upper openings 35.1 of the piles 4 with their lower ends and rest thereon with the shoulders 64. Letting down takes place by means of the jacking systems 54 in that the hydraulic cylinders 61 are moved asunder and the horizontal hole 60 of the movable latch 58 is aligned to a blind hole 62 of a leg 7.

Thereafter, a bolt 63 is plugged into the horizontal hole 60 and the blind hole 62, and the bolt 63 is drawn out of the stationary latch 55.

Thereafter, the hydraulic cylinders 61 are moved together, whereby the legs 7 are let down. They are let down until a blind hole 62 of the leg 7 is aligned to the horizontal hole 57 of the stationary latch 55. Thereafter, each leg is secured by means of a bolt which is plugged into the horizontal hole 57 of the stationary latch 55 and the blind hole 62 of the leg 7. The bolt 63 is subsequently drawn out of the movable latch 58 and the above-described procedures are repeated until the legs 7 have arrived in their final positions.

Figure 18:
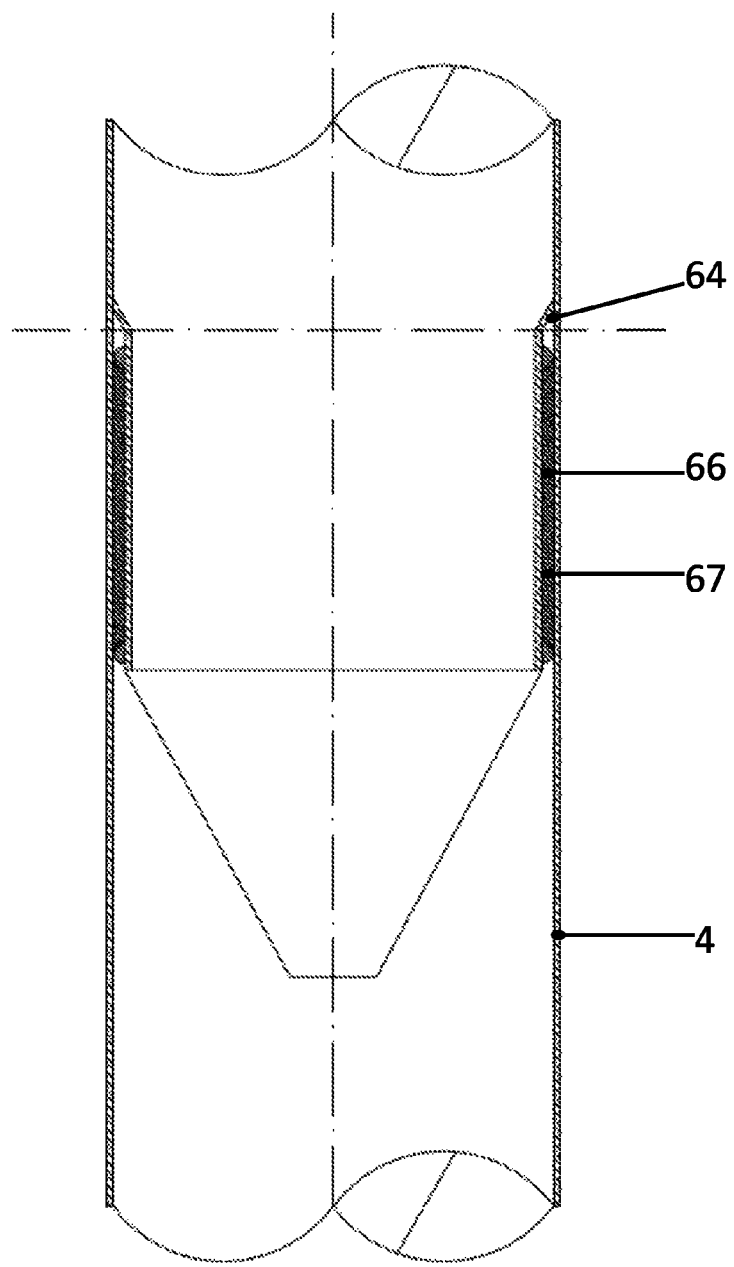
FIG. 18 the same interface after the connection has been produced, in a vertical section.
Figure 19:
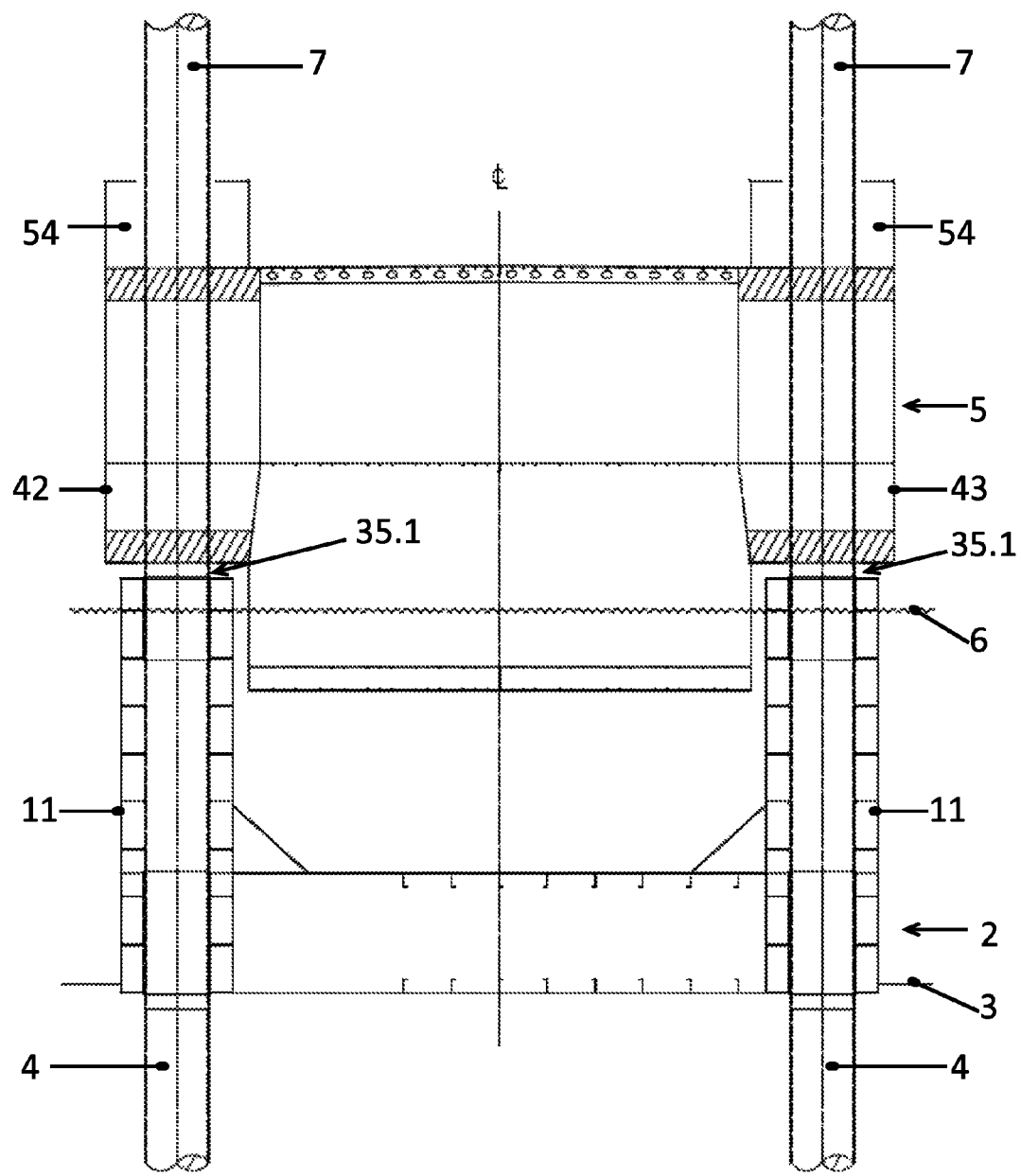
FIG. 19 the same platform topside when the legs are being connected to the piles of the base frame, in a vertical section.

When the legs 7 engage into the piles 4 according to FIG. 18, they are connected to the piles by positive fit. For this purpose, they are preferably grouted with the piles by dumping a grouting material 67 into the gap 66.

The above works can be performed relatively easily, because the interface or connection site, respectively, between the legs 7 and the piles 4 is situated above the water surface area 6 or in the close range below the water surface area 6.

After producing a permanent connection between the legs 7 of the platform topside 5 and the piles 4 of the base frame 2, the platform topside is lifted to the envisioned installation height. The installation height is selected such that the highest possible wave which can be expected at the installation location according to water level analysis (once-in-a-hundred-years wave) still passes below the platform topside. In the example, the installation height is 161 m above LAT.

Lifting the platform topside 5 is done by means of the jacking systems 54. These are operated in the manner described above, wherein the platform topside 5 is lifted by drawing the hydraulic cylinders 61 together. When the platform topside 5 has reached the installation height, the legs 7 are secured in the final position by plugging bolts 63 into the horizontal hole 57 of the stationary latch 55 and into blind holes 62 of the legs 7. An elastically mounted bolt connection can be used for this.

The completed offshore platform 1 is shown in FIG. 1. The cable tower 32 reaches upward up to a lateral overhang 42. A bridge 68 is installed in addition there, via which sea cables can be led over into the platform 5 and which facilitates installation works.

This completes the description of the preferred and alternate embodiments of the invention. Those skilled in the art may recognize other equivalents to the specific embodiment described herein which equivalents are intended to be encompassed by the claims attached hereto.

What is claimed is:

1. A base frame for an offshore platform (1) comprising
   a. a self-floating lower building structure (8) having a stable trim,
   b. at least one tank (18) in the lower building structure (8) which is dimensioned such that the lower building structure (8) sinks when the at least one tank (18) is flooded,
   c. mechanism for flooding (19) the at least one tank (18),
   d. mechanism for bearing (11, 15, 16) piles (4) in upright standing arrangement on the lower building structure (8),
   e. the lower building structure having a horizontal underframe consisting of several frame parts which are connected to each other on corners of the underframe, the lower building structure being configured as buoyancy body which has several hollow chambers and the mechanism for bearing the piles comprise towers that project upward from the lower building structure, each tower having a lower and an upper opening, a passage between the upper and the lower opening, and an upper and a lower bearing for one of the piles, each of the towers having one further tank, the towers having closed side walls, a closed bottom wall with a lower opening of the lower bearing therein, a pressure seal in the lower bearing and a cavity in each of the towers around the pile that is borne therein, so that water cannot enter into the cavity of each of the towers through the lower opening, the cavity forming the further tank.

2. The base frame according to claim 1, wherein piles (4) are borne in the mechanism for bearing (11, 15, 16) and the base frame (2) equipped with the piles (4) is self-floating and has a stable trim.

3. The base frame according to claim 1, wherein the lower building structure (8) has a horizontal underframe (9).

4. The base frame according to claim 1, wherein the lower building structure (8) at least one tank comprises several tanks (18) which are disposed in an offset to each other in a horizontal plane, and the mechanism for flooding (19) is configured such that water is flooded into the several tanks (18) to different extents or to the same extent.

5. The base frame according to claim 1, wherein the mechanism for bearing the piles (4) are towers (11) projecting upward from the lower building structure (8), each tower having a lower and an upper opening (13, 14), a passage between the upper and the lower opening, and an upper and a lower bearing (15, 16) for the pile.

6. The base frame according to claim 1, with a mechanism for fixing the piles (24) in the mechanism (11, 14, 15) for bearing the piles (4), or a mechanism for braking (24) a lowering motion of the piles (4) with respect to the lower building structure (8).

7. The base frame according to claim 1, with a mechanism for connection (35) with legs (7) of a platform (5) at upper ends of the piles (4) or at upper ends of the towers (11) or the upper ends of both the towers and piles.

8. The base frame according to claim 1, which is configured such that the towers (11) have upper ends that project upward from the water surface area (6) on a set-up location at a certain water level according to water level analysis, or are disposed in the close range below the water surface area (6), or by means of the piles (4), a pile foundation is made in the sea floor at said water level, and the piles project upward up to the water surface area (6) with their upper ends, or are disposed below the water surface area (6).

9. The base frame according to claim 1, which has a cable tower (32) that projects upward from the lower building structure (8).

10. A method for installing a base frame for an offshore platform (1) comprising the steps of:
building a base frame (2) having a self-floating lower building structure having a stable trim and at least one tank in the lower building structure to allow the lower building structure to sink when the at least one tank is flooded, the lower building structure having a horizontal underframe consisting of several frame parts which are connected to each other on corners of the underframe, the lower building structure being configured as buoyancy body which has several hollow chambers and a mechanism for bearing piles which comprises towers that project upward from the lower building structure, each tower having a lower and an upper opening, a passage between the upper and the lower opening, and an upper and a lower bearing for one of the piles, each of the towers having one further tank, each of the towers having closed side walls, a closed bottom wall with a lower opening of the lower bearing therein, a pressure seal in the lower bearing and a cavity in each tower around the pile that is borne therein, so that water cannot enter into the cavity of the into the cavity of the tower through the lower opening, the cavity forming the further tank,
transporting the base frame to a set-up location on the sea in a self-floating manner,
flooding the base frame (2) and letting the base frame down to the sea floor (3), and anchoring the base frame (2) on the sea floor (3) by piles (4), with each of the towers projecting upward from the lower building structure, and the further tank acting as a further buoyancy cell such that when the further tank is not filled with water and the lower building structure is let down by flooding the at least one tank of the lower building structure, an unstable condition of the lower building structure is avoided by the further tank when the lower building structure dips into the water.

11. The method according to claim 10, further including the steps of:
equipping the base frame (2) with the piles (4) before the transportation to the set-up location, and
transporting to a set-up location the base frame (2) with the piles (4) in a self-floating manner.

12. The method according to claim 10, further including the steps of:
aligning the base frame (2) when the base frame is being let down by purposeful control of the water amounts which flow into the at least one tank (18) in the flooding.

13. The method according to claim 10, further including the steps of:
installing the base frame (2) and the piles (4) on the sea floor such that the upper ends of the piles (4), or the upper ends of the towers (11) or the upper ends of the piles and towers project upward above the water surface area (6) or are disposed below the water surface area (6).

14. The method according to claim 10, further including the steps of:
connecting the piles (4) to the base frame (2) with positive fit after having been driven into the sea floor (4).

* * * * *